United States Patent [19]

McKibben et al.

[11] 4,327,782
[45] May 4, 1982

[54] DISPENSING APPARATUS HAVING PORTABLE MEANS FOR DISPENSING PREDETERMINED QUANTITY OF LIQUID FROM A BULK CONTAINER

[75] Inventors: Gary E. McKibben; John S. Amneus, both of Cincinnati, Ohio

[73] Assignee: The Procter & Gamble Company, Cincinnati, Ohio

[21] Appl. No.: 137,047

[22] Filed: Apr. 3, 1980

[51] Int. Cl.³ .................... B65B 3/30; B65D 25/42
[52] U.S. Cl. .......................... 141/26; 141/311 R; 141/369; 222/464; 222/575
[58] Field of Search .............. 141/22, 2, 18, 21, 23, 141/24, 25, 26, 28, 114, 311 R, 369, 372, 380; 222/209, 464, 575

[56] References Cited

U.S. PATENT DOCUMENTS

| | | |
|---|---|---|
| 2,311,367 | 2/1943 | Chambers . |
| 2,599,446 | 6/1952 | Greene . |
| 3,089,623 | 5/1963 | Padzeski . |
| 3,100,068 | 8/1963 | Kersten . |
| 3,254,809 | 6/1966 | Breneman . |
| 3,266,532 | 8/1966 | Stewart ................. 141/24 |
| 3,323,689 | 6/1967 | Elmore . |
| 3,396,875 | 8/1968 | Finch . |
| 4,079,859 | 3/1978 | Jennings . |
| 4,157,768 | 6/1979 | Britt . |

Primary Examiner—Frederick R. Schmidt
Attorney, Agent, or Firm—E. Kelly Linman; John V. Gorman; Richard C. Witte

[57] ABSTRACT

A portable dispensing appratus which includes a resiliently deformable dispensing reservoir adapted to mount removably on the uppermost end of a dip tube which extends into a bulk container of liquid. The dip tube includes a one-way inlet valve near its lowermost end which prevents flow of liquid out of the dip tube, but which permits flow into the dip tube. Suction created by compressing the resiliently deformable reservoir causes liquid to enter the dip tube through the one-way inlet valve and to flow into the reservoir. The dispensing reservoir can then be removed from the dip tube and taken to a location where it is desired to dispense all or a portion of the liquid. The liquid is dispensed by squeezing the resiliently deformable reservoir, thereby forcing the liquid out through the nozzle. A one-way, pressure-operated outlet valve is preferably located in the dip tube inside the bulk container to permit compression of the resiliently deformable reservoir after placement of the reservoir on the dip tube. The one-way, pressure-operated outlet valve permits return of the bottle of any air and/or unused liquid in the reservoir, thereby ensuring that a full measure of liquid will be drawn into the reservoir for the next dispensing cycle.

16 Claims, 18 Drawing Figures

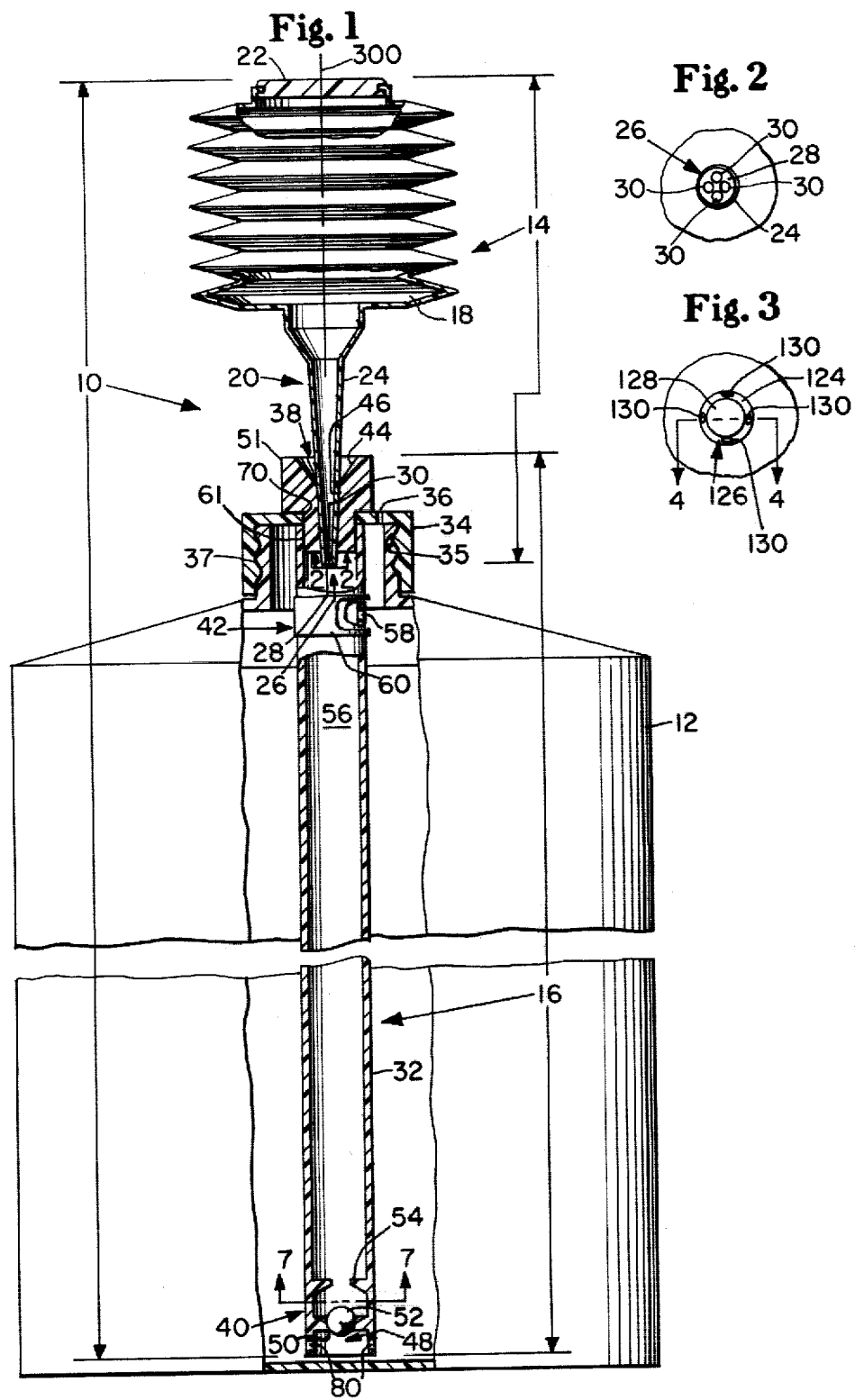

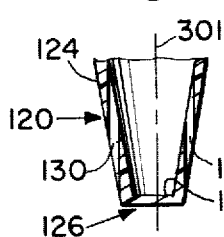
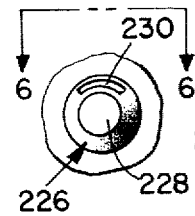
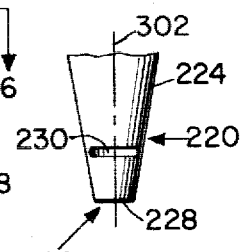
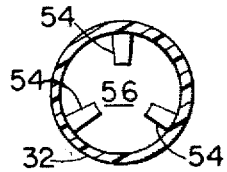
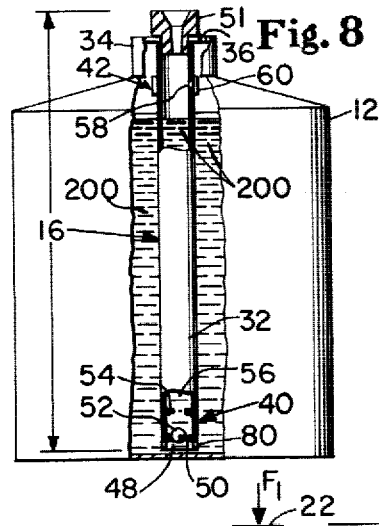
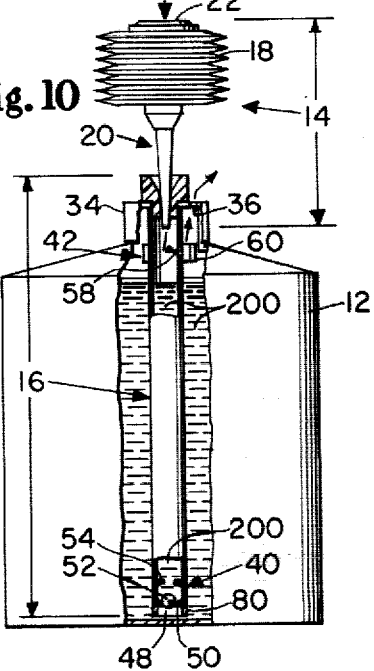
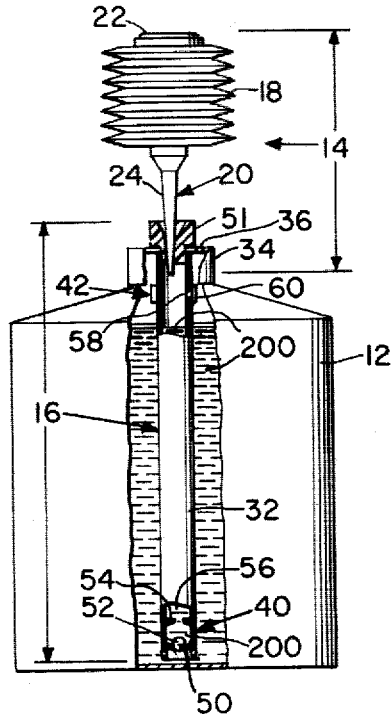

DISPENSING APPARATUS HAVING PORTABLE MEANS FOR DISPENSING PREDETERMINED QUANTITY OF LIQUID FROM A BULK CONTAINER

TECHNICAL FIELD

The present invention relates to a dispensing apparatus having portable means for dispensing a predetermined volume of liquid from a bulk container of said liquid. More particularly, the invention relates to a dispensing apparatus having a portable device removably connected to a bulk source of liquid from which a predetermined quantity of liquid is to be drawn for subsequent dispensing at a remote location.

BACKGROUND ART

Many prior efforts have been made to dispense a small measured quantity of liquid from a large liquid container such as a bottle of laundry detergent. These prior efforts have generally required filling of a measuring reservoir dispenser either by tilting of a large bottle or by squeezing of a bottle which, although larger than the measuring reservoir dispenser, is usually hand-sized. In either case, transportation of the bulk container, which usually comprises a large bottle, to the place where the liquid is to be dispensed is required.

The measuring dispensers requiring tilting of a large bottle generally have a measuring reservoir either integral with or secured to the top of the bottle. Representative prior art structures are disclosed in U.S. Pat. No. 3,396,875 issued to Finch on Aug. 13, 1968 and U.S. Pat. No. 4,079,859 issued to Jennings on Mar. 21, 1978. Other prior efforts have secured the measuring reservoir, which is filled by tilting of the bottle, to the mouth of the bottle by the use of threaded attachment means. An exemplary prior art structure is disclosed in U.S. Pat. No. 3,254,809 issued to Breneman on June 7, 1966. Clearly, removal of the filled measuring reservoir disclosed in Breneman by unscrewing from the mouth of the bottle is not contemplated during the dispensing operation.

A second known method of dispensing a measured quantity of liquid from a bulk liquid container such as a bottle is to employ a bulk liquid container comprising a hand-graspable squeeze bottle. By squeezing the bottle a quantity of liquid is forced up a dip tube into a top-mounted measuring reservoir. The measuring reservoir is typically attached to the bottle by a threaded connection, and removal of the filled measuring reservoir by unscrewing is not contemplated during the dispensing operation. The bottle is most conveniently carried to the site of dispensing and tilted to dispense the liquid collected in the reservoir. Accordingly, the size of the bottle is limited. Typical prior art structures employing this approach are disclosed in U.S. Pat. No. 4,157,768 issued to Britt on June 12, 1979 and U.S. Pat. No. 3,089,623 issued to Padzieski on May 14, 1963.

It is also known to secure an external squeeze bulb to a bulk container, such as a bottle, to facilitate dispensing of liquid. U.S. Pat. No. 3,100,068 issued to Kersten on Aug. 6, 1963 discloses a squeeze bulb dispenser 11 secured to a source of liquid by means of a one-way inlet valve 12 and a flexible liquid supply tube 14. The one-way inlet valve 12, which is located at the base of the dispenser 11, prohibits the flow of liquid from the dispenser back into the bottle 18 when the bulb 11 is squeezed, while a second one-way outlet valve 13 responds to the application of manual pressure to the bulb 11 to dispense liquid. Dispensing is carried out with the bulb 11 attached to the bottle 18. Similarly U.S. Pat. No. 2,311,367 issued to Chambers on Feb. 16, 1943 discloses a squeezable bulb which is positioned atop a bottle containing a dip tube. Squeezing the bulb causes liquid to be forced from the bottle through the dip tube into the bulb. The liquid is then dispensed from the bulb, while attached to the bottle, through a separate opening. If desired, a dauber can be incorporated inside the squeezable bulb and removed from the bulb for use at a remote location. U.S. Pat. No. 3,323,689 issued to Elmore on June 6, 1967 discloses yet another bellows-type pump threadedly attached to the top of a bottle for pumping a liquid from the bottle. Liquid is dispensed through a valved dip tube and out a pipe without entering the interior regions of the squeezable pump, which remains secured to the bottle during the dispensing operation.

Accordingly, it is an object of the present invention to provide dispensing means removably connected to a bulk liquid container for withdrawing a predetermined quantity of liquid from the container and dispensing it at a location remote from the container.

It is another object of the present invention to provide means for dispensing a predetermined quantity of liquid from a large bulk container without requiring tilting or squeezing of the bulk container.

It is also an object of the present invention to provide means for returning any unused liquid to the bulk container and for ensuring that a predetermined quantity of liquid will be available in the dispensing means for the next dispensing cycle.

It is still another object of the present invention to provide a structure which requires only one hand to withdraw liquid from a bulk container and to thereafter dispense the drawn liquid at a remote location.

It is yet another object of the present invention to provide a dispensing apparatus which maintains its liquid prime intermediate dispensing cycles.

DISCLOSURE OF THE INVENTION

The present invention relates to a liquid dispensing apparatus having means for dispensing a predetermined quantity of liquid from a bulk container of said liquid while disconnected from the bulk container. The preferred dispensing apparatus includes a dip tube which has uppermost and lowermost ends. Near its uppermost end the dip tube has attachment means for securing the dip tube in a bulk container such as a bottle. The attachment means includes an air vent for venting the bottle. The dip tube has a one-way inlet valve at its lowermost end to prevent liquid flow out the lowermost end of the tube. In a particularly preferred embodiment, the dip tube also includes near its uppermost end a one-way, pressure-operated outlet valve which allows air and/or liquid to be exhausted from the dip tube in response to an increase in pressure therein. The uppermost end of the dip tube is open, and a portable, resiliently deformable dispensing reservoir having a suction chamber with a nozzle extending outwardly from the chamber is releasably secured in airtight engagement with the uppermost end of the dip tube. The dip tube and suction chamber are maintained in exclusive fluid communication with one another when the nozzle is engaged in the uppermost end of the dip tube.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

FIG. 1 is a partially sectioned, elevational view of a preferred embodiment of the present invention showing the portable dispensing means engaged, in an undeformed condition, in a bulk liquid container comprising a bottle;

FIG. 2 is an enlarged view taken along view line 2—2 of FIG. 1 showing the orifice configuration in the nozzle end wall;

FIG. 3 is an enlarged view generally similar to that of FIG. 2, but showing another embodiment of the present invention;

FIG. 4 is a partial cross-sectional view taken along section line 4—4 of FIG. 3;

FIG. 5 is an enlarged view generally similar to that of FIG. 2, but showing still another embodiment of the present invention;

FIG. 6 is an enlarged view taken along view line 6—6 of FIG. 5;

FIG. 7 is a view taken along section line 7—7 of FIG. 1 showing the configuration of the restraining tabs within the dip tube;

FIGS. 8-14 show a complete dispensing cycle of the dispensing apparatus generally shown in FIG. 1;

DETAILED DESCRIPTION OF THE INVENTION

Figure 11:
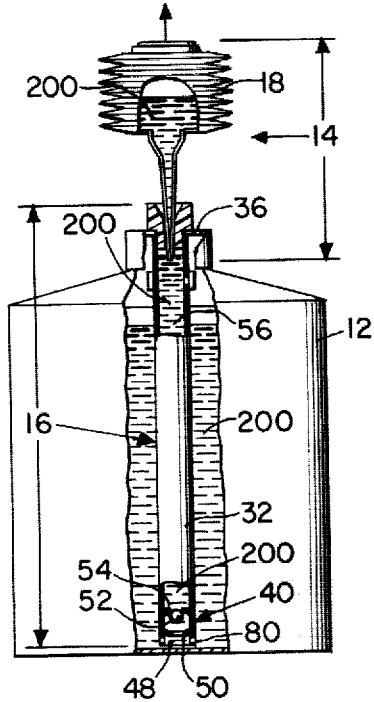

Referring to the drawings wherein like reference characters are utilized for like parts throughout the several views, there is illustrated in FIG. 1 a liquid dispensing apparatus 10, in accordance with the present invention, engaged in a bulk liquid container comprising a bottle 12. The liquid dispenser 10 includes a portable, resiliently deformable reservoir 14 and a dip tube 16.

In the preferred embodiment shown in FIG. 1, resiliently deformable reservoir 14 has a pleated suction chamber 18, an outwardly extending nozzle 20, and a finger pad 22 sealingly engaged with chamber 18. The pleated suction chamber 18, which may conveniently be a molded plastic bellows, is sized to hold a desired quantity of liquid in the non-deformed condition shown in FIG. 1. The nozzle 20 communicates with the interior of the pleated suction chamber 18. Alternatively, the resiliently deformable pleated suction chamber 18 may be comprised of any conventional chamber capable of developing suction including, for example, a conventional resilient bulb, a conventional syringe having a spring-loaded, movable piston which can be displaced from its original position to develop suction, or the like. Preferably if the chamber 18 is a resilient bulb it has an elastic memory so that it attempts to return to its original shape and volume after deformation.

Nozzle 20 includes a tapered spout 24 which terminates at tip 26. Tip 26 preferably contains a plurality of orifices 30 in its end wall 28, as shown in FIG. 2. The orifices 30 are preferably arranged around the periphery of the circular end wall 28 and are preferably so oriented that the liquid streams discharged therethrough are oriented substantially parallel to the centerline 300 of the nozzle 20. In another embodiment of the present invention, end wall 128 is unperforated, but tapered spout 124 has orifices 130 arranged around its periphery adjacent to, but spaced from end wall 128, as shown in FIGS. 3 and 4. Liquid streams discharged through orifices 130 are oriented substantially parallel to centerline 301 of nozzle 120. In still another embodiment shown in FIGS. 5 and 6, a single peripheral slot 230 extends partially about the circumference of spout 224. Located in tip 226 adjacent to, but spaced from the closed end wall 228, the slot 230 directs the discharged liquid substantially perpendicular to the centerline 302 of the nozzle 220. Of course, the nozzle tip 26 may comprise one large orifice in end wall 28, or the end wall 28 may be completely eliminated where dispersion of the liquid into multiple streams is not desired. It is generally preferred, however, that the orifice or orifices employed be sufficiently small in size that dripping of liquid from the nozzle is not encountered when the suction chamber 18 is not being manually deformed.

Figure 16:
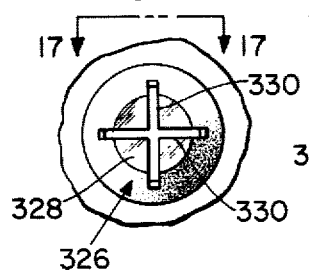
FIG. 16 is an enlarged view generally similar to that of FIG. 2, but showing still another embodiment of the present invention.
Figure 17:
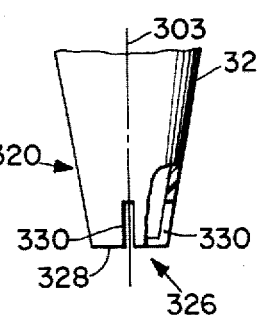
FIG. 17 is a partially segmented view taken along view line 17—17 of FIG. 16.

In the event liquid products which could cause irritation are to be dispensed, it is generally preferred that the design of the discharge orifice or orifices be such that the product stream or streams exhibit a relatively short trajectory, even when the reservoir is squeezed very hard. This minimizes the chance of improper use. The nozzle embodiment 320 disclosed in FIGS. 16 and 17 is particularly suitable in this regard. The discharge orifice comprises two intersecting slots 330 in nozzle tip 326. The slots 330 pass through end wall 328 and may, if desired, pass partially into tapered spout 324. The width of slots 330 will depend upon the pliability of the nozzle material and the viscosity of the particular liquid to be dispensed.

In practice, the slots 330 may range in width from mere slits, the faces of which are in sealed relation with one another when the fluid pressures on opposite sides of the end wall are at equilibrium, to relatively wide rectangular openings where highly viscous products are involved. It is critical, however, where intersecting slits are employed that their geometry and the materials of construction for the nozzle be such that they will not form an impenetrable seal which prevents filling of the reservoir when the suction chamber is compressed. In the event intersecting slits are employed, at least the end wall 328 must be sufficiently pliable that it will deflect inwardly to allow filling of the reservoir with liquid in response to suction and deflect outwardly to discharge liquid in response to pressure applied to the reservoir.

Generally speaking, embodiments of this type are more resistant to dripping, particularly where low viscosity liquids are involved. In addition, they exhibit a discharge stream having a size and trajectory which is roughly proportional to the amount of pressure applied to the reservoir during the dispensing operation. Furthermore, the liquid product stream is highly coalesced and exhibits a relatively short trajectory in a direction substantially parallel to the centerline 303 of nozzle 320.

This is due to the resilient nature of the orifice which expands and contracts in size in response to the pressure of the liquid.

Dip tube 16 preferably includes a pipe 32 which is secured to the shoulder 61 of flanged member 51 which passes through a hole 70 in the threaded cap 34. The threaded cap 34 has internal threads 35 which mate with the threads 37 on the mouth of the bottle 12 to allow the dip tube 16 to be attached to the bottle. The threaded cap 34 also has a vent hole 36 which prevents a vacuum from developing in the interior of the bottle as liquid is dispensed.

The dip tube 16 has an uppermost opening 38 in flanged member 51, a lowermost opening 48 having a one-way inlet valve 40, located adjacent thereto, and a one-way, pressure-operated outlet valve 42. The pipe 32 should be of sufficient length to maintain lowermost opening 48 below the liquid level in the bottle 12 at all times. This can be accomplished by either the manufacturer of the dispensing apparatus or the consumer by cutting the uppermost end of pipe 32 to length before securing the uppermost end of pipe 32 over the shoulder 61 of flanged member 51. To eliminate the possibility of malfunction in the event lowermost opening 48 is completely blocked by the floor of container 12, a multiplicity of orifices 80 may be provided about the periphery of pipe 32 intermediate one-way inlet valve 40 and lowermost opening 48.

Figure 15:
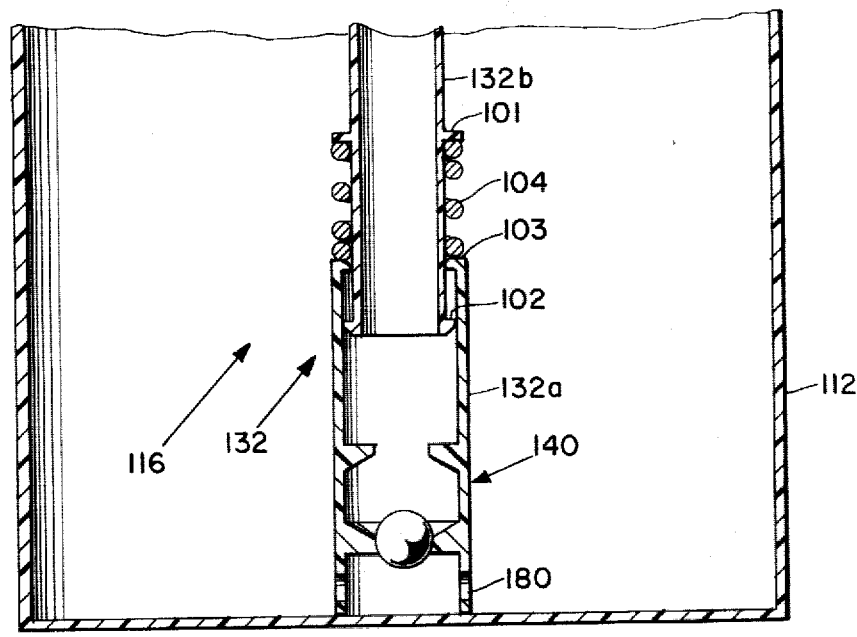
FIG. 15 is a segmented sectional view similar to that of FIG. 1 of an alternative embodiment of the present invention.

Alternatively, in the dip tube embodiment 116 shown in FIG. 15 pipe 132 comprises lowermost end 132a telescopically secured to uppermost end 132b. In the illustrated embodiment, lowermost end 132a is provided with a retaining flange 103 which slidably and sealingly engages the outermost surface of uppermost end 132b. Uppermost end 132b is provided with a lowermost retaining flange 102 and an uppermost flange 101 which serves to constrain compression spring 104 against flange 103 of lowermost end 132a. The distance between flanges 101 and 102 determines the container height variation which can readily be accommodated. The pipe 132 of this particular embodiment automatically adjusts to different container heights when the cap is secured to the bottle mouth, since the lowermost end 132a is forced into contact with the floor of container 12, thereby compressing spring 104. Liquid is allowed to enter inlet valve 140 via orifices 180 located about the periphery of lowermost end 132a. This vertical adjustability provides desired flexibility when the present dispensing apparatus is employed on bulk containers of different heights. Other vertically adjustable means well known in the art, e.g., resiliently deformable bellows, may be utilized with equal facility to accomplish the foregoing objective.

In the dispensing apparatus shown in FIG. 1 uppermost opening 38 in flanged member 51 preferably has a tapered inlet 44 which leads to a cylindrical gripping ring 46. The gripping ring 46, which is preferably resilient, permits frictional, airtight engagement with nozzle 20 of reservoir 14. The diameter of the opening in ring 46 is sized to permit the tip 26 of nozzle 20 to extend a sufficient distance into the interior channel 56 of dip tube 16 that the orifices 30 are in fluid communication with channel 56.

One-way inlet valve 40 is located adjacent lowermost opening 48 of pipe 32 in its interior channel 56. The valve 40 prevents flow out of the dip tube 16, particularly when the liquid level in the bottle is too low to maintain the desired liquid level in the tube, thereby ensuring that tube 16 will always be primed with liquid once the dispensing apparatus has been placed in service. The valve 40, which can be of any conventional one-way design is illustrated in FIG. 1 as a simple ball valve having a ring-shaped lowermost stop 50, a ball 52 and opposed uppermost restraining tabs 54, shown in FIGS. 1 and 7. Lowermost stop 50 reduces the diameter of interior channel 56 so that when ball 52 rests against it liquid is prevented from flowing out of the interior channel of pipe 32. However, uppermost restraining tabs 54, which are spaced above stop 50, extend into the interior channel 56 from the inside surface of the pipe 32 and permit liquid to pass between them when ball 52 is pushed against them by the entering liquid. Tabs 54 also serve to retain ball 52 physically close to stop 50. Ball 52 is comprised of a material having a greater density than the liquid to be dispensed so that it will rapidly settle against lowermost stop 50 when the pressure outside pipe 32 is equal to or less than that inside the pipe. Steel is a particularly preferred material when the liquid to be dispensed is comprised of a relatively viscous material such as laundry detergent. The liquid passes through valve 40 by flowing around ball 52 and tabs 54 when the ball is held against the tabs by liquid pressure. This condition will prevail whenever the pressure within channel 56 is lower than the pressure of the liquid in container 12 at the level of lowermost opening 48.

One-way, pressure-operated outlet valve 42 located inside bottle 12 allows fluid which may comprise air and/or liquid within pipe 32 to be discharged back into the bottle in response to an increase in pressure within the pipe. Any conventional one-way, pressure-operated valve may be used as the pressure-operated valve 42. However, a simple belly-band valve, as shown in FIG. 1, is preferred. Preferably the valve 42 is located near the top of the bottle 12 in the upper region of pipe 32. The preferred valve 42 comprises a hole 58 in pipe 32 covered by an elastomeric band 60, which is preferably comprised of rubber, secured about the periphery of the pipe. The hole 58 extends from the outside of pipe 32 to interior channel 56. Flow from the dip tube 16 back into the bottle is normally prevented by elastomeric band 60 which extends around the periphery of pipe 32, thereby covering hole 58. Elastomeric band 60 is resiliently biased to grip pipe 32. When an excessive pressure is developed in interior channel 56, as by squeezing chamber 18, the elastomeric band 60 is deformed by the pressure applied through hole 58 and either air or liquid is allowed to discharge between the inside surface of elastomeric band 60 and the exterior of pipe 32.

Operation of a preferred dispensing apparatus of the present invention is described hereinafter in conjunction with FIGS. 8–14. FIG. 8 shows the condition existing after dip tube 16 has been inserted into a full bulk container housing a quantity of liquid 200. The gravitational head of the liquid within the container has caused the liquid to enter channel 56 to a level approximating that in the container through inlet valve 40. When it is desired to dispense a predetermined quantity of liquid from the bulk container 12, nozzle 20 of the substantially undeformed reservoir 14 is engaged in uppermost opening 38 of dip tube 16, as generally shown in FIG. 9. The tip 26 of nozzle 20 passes through tapered inlet 44 and gripping ring 46 and extends into interior channel 56 of pipe 32. As the nozzle 20 extends further and further into channel 56 the friction between the sides of the tapered spout 24 of nozzle 20 and the gripping ring 46 increases. An airtight fit is ultimately obtained when the orifices 30 in tip 26 extend into interior channel 56. It is preferred that the frictional engagement of the nozzle 20 in gripping ring 46 be sufficient to support the reservoir 14 atop the dip tube 16. The pleated suction chamber 18 of reservoir 14 is thereafter compressed by application of force $F_1$, generally shown in FIG. 10, thereby exhausting air from pleated chamber 18 through nozzle 20 and out pressure-operated valve 42. This is conveniently accomplished by compressing the finger pad 22 of the pleated suction chamber 18 with the palm of the hand.

Figure 13:
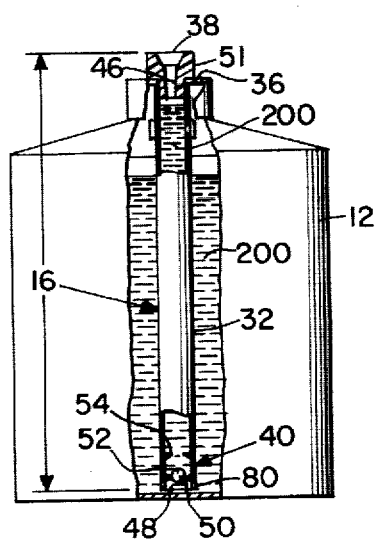

As shown in FIG. 11, a vacuum is created inside pleated suction chamber 18 as the suction chamber 18 naturally returns to its undeformed shape due to its elastic memory. The suction causes liquid in interior channel 56 to be drawn into reservoir 14. The pressure differential existing between the liquid in the bottle 12 and the liquid in channel 56 causes ball 52 of one-way inlet valve 40 to be pressed against restraining tabs 54, enabling dip tube 16 to draw liquid into it through a combination of capillary action and the pressure differential existing between the inside and the outside of pipe 32. The aforementioned pressure differential is due to the gravitational head created by the elevation of the liquid in bottle 12 and the suction supplied by the reservoir 14. When the gravitational head is small, which will be the case when the level of liquid in the bottle 12 is low, one-way inlet valve 40 serves to maintain the liquid prime of dip tube 16 by preventing the liquid sucked into dip tube 16 by reservoir 14 from exiting out of the dip tube when the suction is discontinued and the reservoir 14 is removed therefrom, as generally shown in FIG. 13. Thus liquid can thereafter be drawn from the dip tube 16 primarily by the suction supplied by reservoir 14 until the supply of liquid in the bottle 12 is essentially exhausted.

Figure 12:
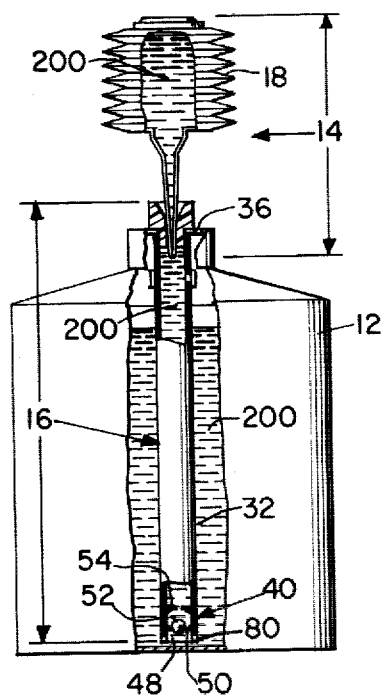
Figure 14:
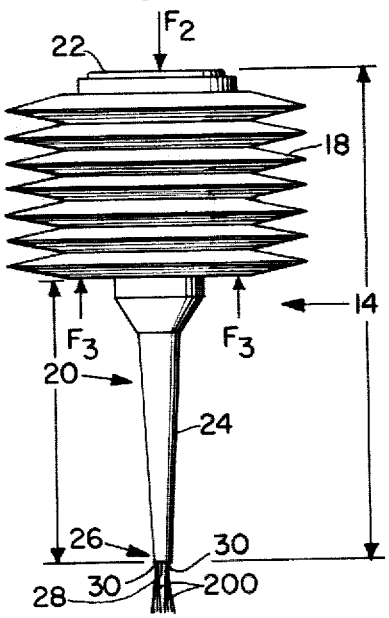

The filled reservoir 14, which is shown in FIG. 12 in its undeformed condition, is manually removed from uppermost opening 38, FIG. 13, and taken to the remote location where it is desired to dispense the liquid. The liquid can be discharged, as shown in FIG. 14, through nozzle 20 by again compressing chamber 18, thereby causing a stream of liquid 200 to exit through each orifice 30 in end wall 28 of nozzle 20. This is most conveniently accomplished by supporting the reservoir 14 intermediate two fingers, i.e., applied forces $F_3$, and squeezing the finger tab 22 with the thumb, i.e., applied force $F_2$. The liquid will be dispensed at a rate regulated by the size of the orifices 30 and the degree of pressure applied to chamber 18 by forces $F_2$ and $F_3$. In this way a sudden blast of liquid out of nozzle 20 is avoided and safe and controlled operation is assured.

If the measured volume of liquid 200 contained in chamber 18 is not completely used, the remaining liquid can be pumped back into the bottle 12 so that a full charge of liquid can thereafter be drawn into reservoir 14. This is accomplished by re-inserting the reservoir 14 in the uppermost opening 38 of dip tube 16, as described previously. Once in place in uppermost opening 38, the reservoir 14 is compressed. The pressure created in the interior channel 56 as the liquid in the reservoir 14 tries to exit into dip tube 16 causes lowermost inlet valve 40 to be tightly closed. However, pressure-operated outlet valve 42 will open when sufficient pressure is generated, allowing the liquid and any trapped air to discharge back into bottle 12. As described previously, the pressure inside channel 56 distends rubber band 60, allowing liquid to discharge between the interior surface of rubber band 60 and the exterior of pipe 32 through hole 58. Once the reservoir 14 is completely exhausted and the chamber 18 completely compressed, the reservoir can be released, as described previously, thereby causing the chamber 18 to be filled with a full charge of liquid. In this regard, it should be noted that once the present dispensing apparatus has been placed in service, the volume of liquid withdrawn each time the reservoir is filled will be substantially constant, since the dip tube will be maintained in its primed condition, shown in FIG. 13, so long as the level of liquid 200 in the bulk container 12 covers lowermost opening 48 and orifices 80 in pipe 32.

In this way a measured quantity of liquid can be dispensed from reservoir 14 at a rate which is determined by the user. This is particularly convenient for dispensing liquid laundry detergent where it may be desired to dispense a portion of the liquid directly onto badly soiled areas of the pieces of laundry and to then dispense the remaining liquid into the laundry machine tub. While the reservoir 14 can be of any convenient size, it has been found particularly desirable that reservoir 14 be sized to hold the recommended total volume of detergent required for a load of washing. The dirty laundry is thereby selectively pretreated without adding more than the recommended amount of detergent to the wash cycle.

Figure 18:
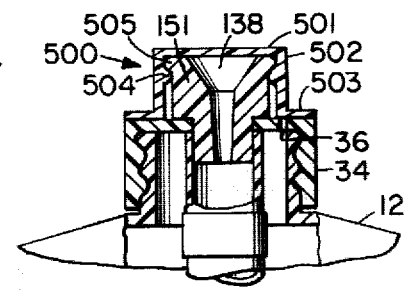
FIG. 18 is a partially segmented view similar to that of FIG. 1 of a dip tube of the present invention fitted with sealing means to permit handling and shipping of the bulk container.

Should it be desirable to handle and ship the filled bulk liquid containers 12 with the dip tube 16 already installed, suitable sealing means for the dip tube air vent and the dip tube nozzle opening must be provided. One such means is illustrated in the embodiment shown in FIG. 18. In particular, the flanged member 151, which is generally similar to flanged member 51 in FIG. 1, is provided with a retaining ring 505 extending about its periphery. The outside diameter of retaining ring 505 is larger than the inside diameter of peripherally extending ring 504 which is secured to the interior of sidewall 502 of sealing member 500. Sealing member 500, which may be molded of a resilient plastic, preferably snaps into place over retaining ring 505 and is secured in position by ring 504. Lowermost flange 503 is thereby maintained in sealed relation to air vent 36 in closure member 34, while end wall 501 is maintained in sealed relation to opening 138 in flanged member 151. This prevents loss of liquid product through either opening 138 or air vent 36 in the event bulk container 12 is inverted. Alternative securement means well known in the art, such as mating threads, could be employed on sealing member 500 and flanged member 151 with equal facility.

While the product reservoir 14 could be supplied as a discrete unit, it is preferable to secure the reservoir to the filled bulk container 12 by any of numerous means well known in the art, thereby providing a sealed shippable assemblage which is ready for use by the consumer upon removal of sealing member 500.

While particular embodiments of the present invention have been illustrated and described, it will be obvious to those skilled in the art that various changes and modifications can be made without departing from the spirit and scope of the present invention, as described in the appended claims.

What is claimed is:

1. A liquid dispensing apparatus having means for dispensing a predetermined quantity of liquid from a bulk container of said liquid at a location remote from said container, said dispensing apparatus comprising a dip tube having uppermost and lowermost ends, said dip tube having attachment means adjacent its uppermost end for securing said dip tube in said container, said dip tube including an air vent for venting said container to atmosphere, said dip tube including a one-way inlet valve adjacent its lowermost end to prevent liquid flow out of said dip tube, said dip tube also including a one-way pressure-operated outlet valve which permits air and liquid to be discharged from said dip tube into said container when pressure is applied inside said dip tube, said means for dispensing a predetermined quantity of liquid from said bulk container comprising a portable deformable reservoir having a suction chamber and a nozzle extending outwardly of said chamber, said nozzle being shaped for airtight, releasable engagement with said uppermost end of said dip tube, whereby said dip tube and said suction chamber are maintained in exclusive fluid communication with one another when said nozzle is engaged in airtight relation to said dip tube.

2. The liquid dispensing apparatus of claim 1 wherein said nozzle is conically tapered and the uppermost end of said dip tube includes a circular gripping ring, whereby said nozzle releasably engages said gripping ring by friction.

3. The dispensing apparatus of claim 1 wherein said pressure-operated outlet valve comprises an elastomeric band resiliently engaged about the periphery of said dip tube and a hole in said dip tube, said elastomeric band covering said hole until fluid pressure is applied inside said dip tube.

4. The dispensing apparatus of claim 1 wherein said suction chamber comprises a resiliently deformable bellows.

5. The dispensing apparatus of claim 1 wherein said dip tube attachment means is secured to said container by means of threads.

6. The dispensing apparatus of claim 1 wherein said uppermost end of said dip tube releasably engages the nozzle of said reservoir so that said nozzle is maintained in a substantially vertical orientation by means of friction.

7. The dispensing apparatus of claim 1 wherein said nozzle has an end wall at its tip, said end wall including a multiplicity of orifices in the flow path of the liquid discharged through said nozzle, each of said orifices being aimed so as to discharge a stream of said liquid in a direction substantially parallel to said nozzle.

8. The dispensing apparatus of claim 1 wherein said nozzle has an end wall at its tip, said end wall being pliable and including a variable sized orifice comprising at least two intersecting slots which allow said end wall to outwardly deflect in response to pressure applied to the fluid contained within said reservoir and to inwardly deflect in response to suction created within said reservoir.

9. The dispensing apparatus of claim 8, wherein said nozzle includes a conically tapered sidewall secured to said end wall and said slots in said end wall extend into said side wall of said nozzle.

10. The dispensing apparatus of claim 8, wherein said slots are comprised of slits in said end wall, the opposing faces of said slits remaining in sealed relation with one another when the fluid pressures on opposite sides of said end wall are in equilibrium.

11. The dispensing apparatus of claim 1 wherein said nozzle has an end wall at its tip and an orifice in the periphery of said nozzle arranged at an angle to the flow path of liquid discharged through said nozzle to discharge said liquid as it exits said nozzle in a direction substantially perpendicular to said nozzle.

12. The dispensing apparatus of claim 11 wherein said orifice comprises a peripherally extending slot positioned near said end wall.

13. The dispensing apparatus of claim 1 wherein said resiliently deformable suction chamber has an elastic memory.

14. The dispensing apparatus of claim 1 wherein the lowermost end of said dip tube is positioned adjacent the bottom of said bulk container.

15. The dispensing apparatus of claim 1 including means for automatically positioning the lowermost end of said dip tube against the bottom of said bulk container, said dip tube also including means for allowing the liquid in said bulk container to contact said one-way inlet valve when the lowermost end of said dip tube is against the bottom of said bulk container.

16. The dispensing apparatus of claim 15, wherein said means for allowing said liquid to contact said one-way valve comprises at least one orifice in the wall of said dip tube, said orifice being located intermediate the lowermost end of said dip tube and said one-way valve.

* * * * *